United States Patent
Watanabe

(10) Patent No.: US 12,379,612 B2
(45) Date of Patent: Aug. 5, 2025

(54) SPECTACLE LENS, SPECTACLE LENS DESIGNING METHOD, SPECTACLE LENS MANUFACTURING METHOD, AND SPECTACLE

(71) Applicant: HOYA LENS THAILAND LTD., Pathumthani (TH)

(72) Inventor: Takatsugu Watanabe, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 717 days.

(21) Appl. No.: 17/666,781

(22) Filed: Feb. 8, 2022

(65) Prior Publication Data
US 2022/0308364 A1    Sep. 29, 2022

(30) Foreign Application Priority Data

Mar. 25, 2021    (JP) ................................. 2021-051149

(51) Int. Cl.
*G02C 7/06*     (2006.01)
*G02C 7/02*     (2006.01)

(52) U.S. Cl.
CPC .............. *G02C 7/06* (2013.01); *G02C 7/027* (2013.01); *G02C 2202/16* (2013.01)

(58) Field of Classification Search
CPC ....... G02C 7/06; G02C 7/027; G02C 2202/16
See application file for complete search history.

(56) References Cited

U.S. PATENT DOCUMENTS

| | | | | |
|---|---|---|---|---|
| 1,427,577 A | * | 8/1922 | Bugbee | G02C 7/06 65/60.2 |
| 2,254,440 A | * | 9/1941 | Moulton | G02C 7/06 264/2.7 |
| 2,618,200 A | * | 11/1952 | Clave | G02C 7/06 351/159.48 |
| 3,684,357 A | * | 8/1972 | Tsuetaki | G02C 7/043 351/159.41 |
| 3,877,798 A | * | 4/1975 | Tolar | G02C 7/06 351/159.62 |

(Continued)

FOREIGN PATENT DOCUMENTS

| | | |
|---|---|---|
| JP | S44-11476 Y1 | 5/1969 |
| JP | 3019270 U | 12/1995 |

(Continued)

OTHER PUBLICATIONS

"Realizing Requests;" Tokai Optical Co., Ltd.; retrieved in 2021; Online; https://www.tokaiopt.info/corporate/technology/t08/.

(Continued)

*Primary Examiner* — Collin X Beatty
(74) *Attorney, Agent, or Firm* — Oliff PLC

(57) ABSTRACT

A spectacle lens in which a region with a specific optical function has a high degree of freedom, and that has a better appearance and a better field of view compared to those achieved when lenses are joined at their cross sections. A spectacle lens and a technique associated therewith, the spectacle lens including a first lens and a second lens that are arranged overlapping each other in an optical axis direction, wherein the second lens has an opening, and the first lens covers the opening.

21 Claims, 10 Drawing Sheets

(56) References Cited

U.S. PATENT DOCUMENTS

| | | | | |
|---|---|---|---|---|
| 4,576,623 | A * | 3/1986 | Mann | G02C 7/06 |
| | | | | 351/159.41 |
| 4,781,452 | A * | 11/1988 | Ace | B29D 11/00009 |
| | | | | 451/43 |
| 4,846,913 | A * | 7/1989 | Frieder | G02C 7/06 |
| | | | | 351/159.75 |
| 10,025,116 | B1 * | 7/2018 | Barrows | G02C 7/105 |
| 10,175,509 | B2 * | 1/2019 | Inui | B29D 11/00432 |
| 2003/0090622 | A1 | 5/2003 | Takeuchi | |
| 2008/0123049 | A1 * | 5/2008 | Volk | B29D 11/00028 |
| | | | | 351/159.41 |
| 2011/0063569 | A1 * | 3/2011 | Miyoshi | G02C 7/108 |
| | | | | 264/1.7 |
| 2011/0228213 | A1 * | 9/2011 | Legerton | B29D 11/00076 |
| | | | | 351/159.62 |
| 2013/0070199 | A1 * | 3/2013 | Blum | G02C 7/061 |
| | | | | 351/159.4 |
| 2016/0266403 | A1 * | 9/2016 | Duis | G02C 7/021 |
| 2018/0210234 | A1 * | 7/2018 | Inui | B29D 11/00432 |
| 2020/0301170 | A1 * | 9/2020 | Shelef | B29D 11/00105 |

FOREIGN PATENT DOCUMENTS

| | | |
|---|---|---|
| JP | 3884945 B2 | 2/2007 |
| JP | 2010-191295 A | 9/2010 |

OTHER PUBLICATIONS

Jul. 2, 2024 Office Action issued in Japanese Patent Application No. 2021-051149.

* cited by examiner

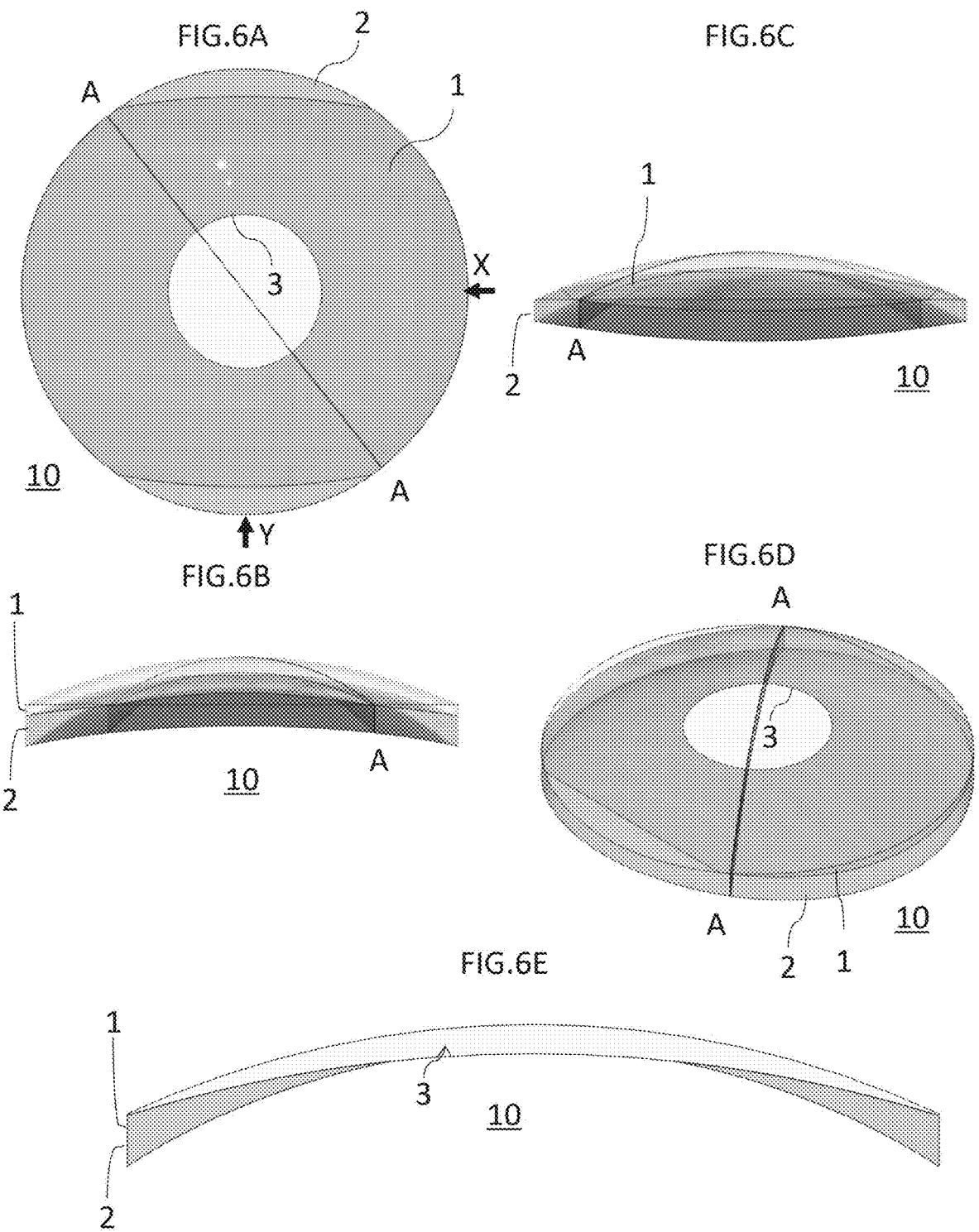

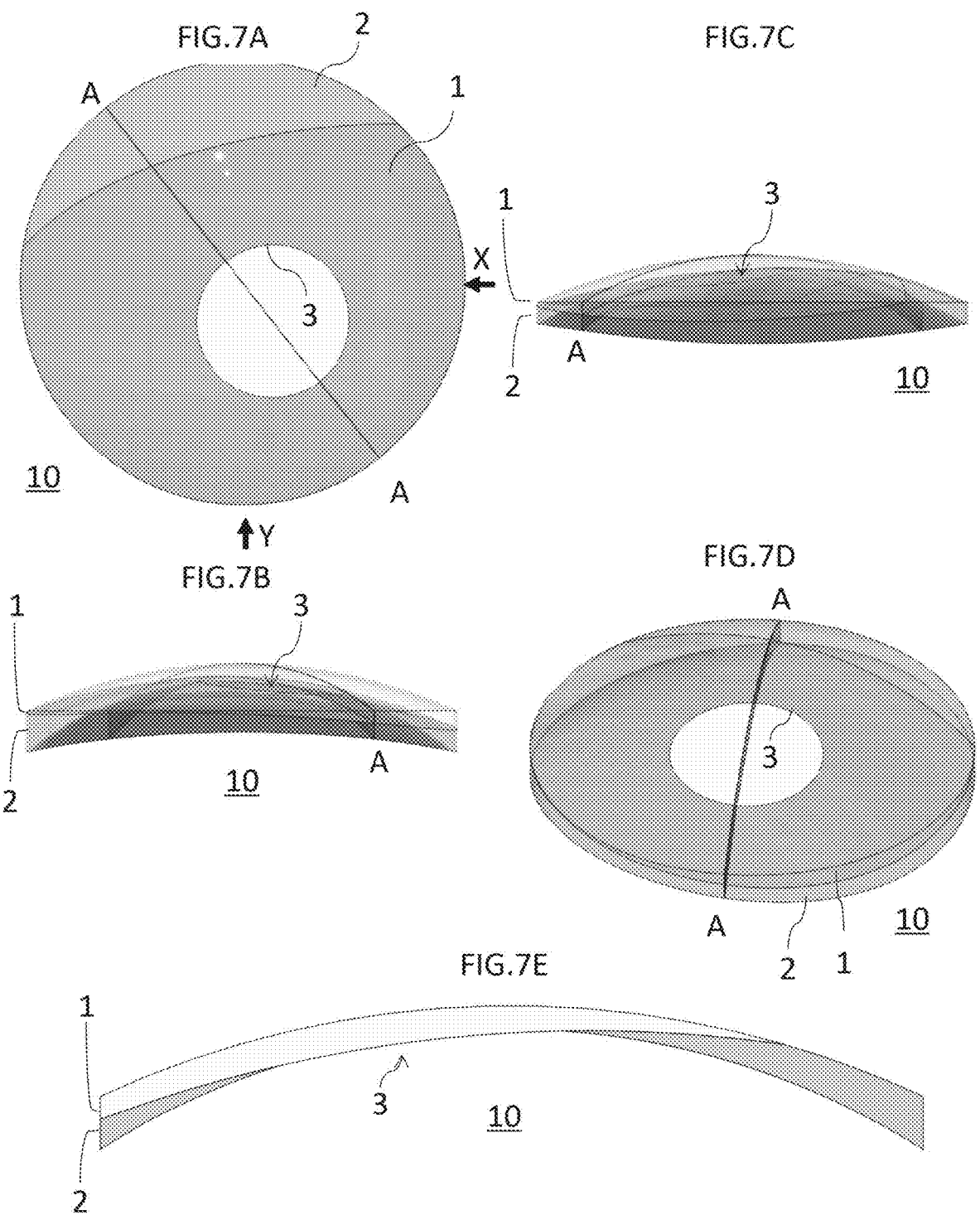

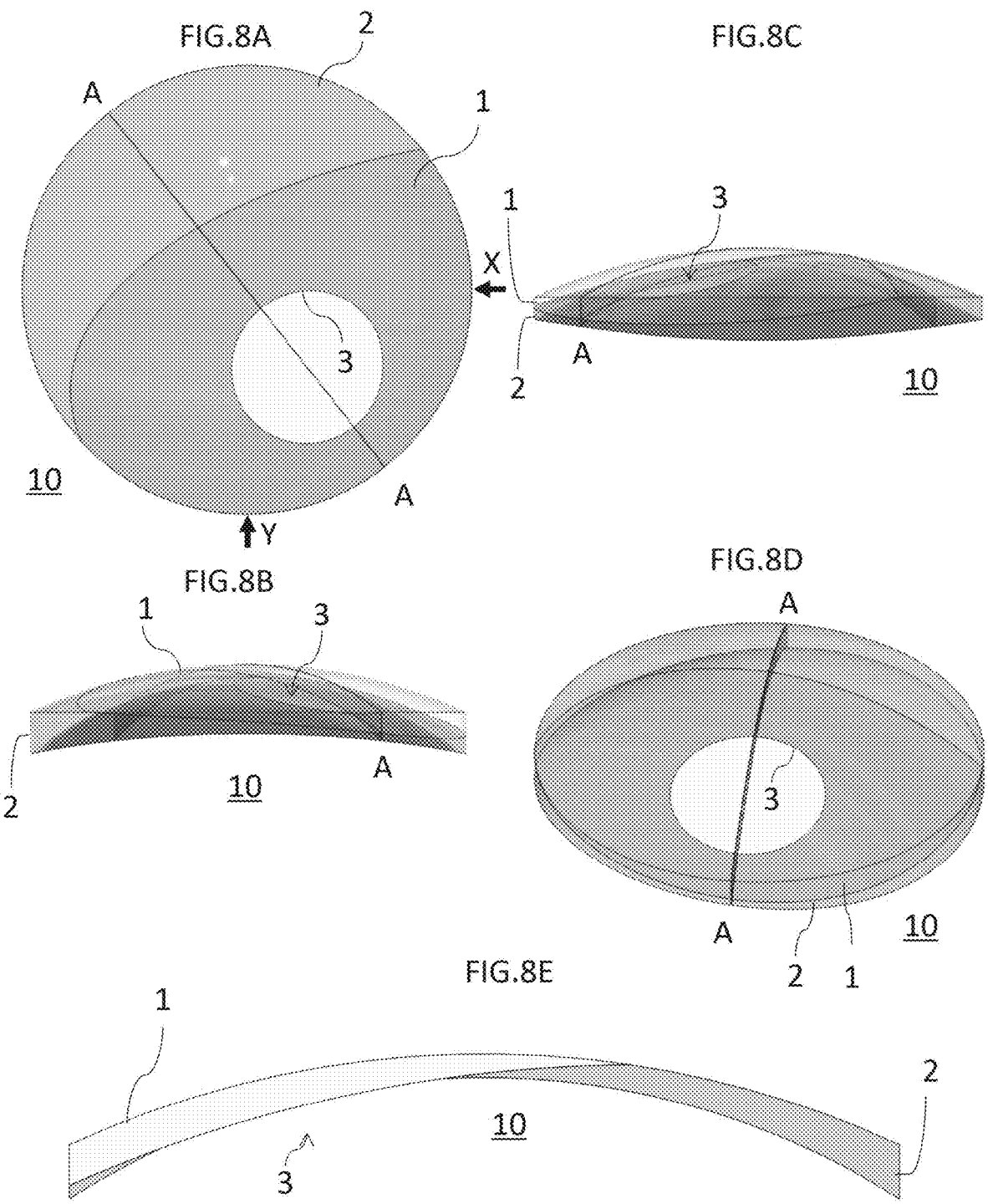

SPECTACLE LENS, SPECTACLE LENS DESIGNING METHOD, SPECTACLE LENS MANUFACTURING METHOD, AND SPECTACLE

BACKGROUND OF THE INVENTION

1. Field of the Invention

The present invention relates to a spectacle lens, a spectacle lens designing method, a spectacle lens manufacturing method, and a spectacle.

2. Description of Related Art

JP 2010-191295A discloses a bifocal lens in which a near lens is placed on the lower nasal side on the object-side surface of a distance lens. The near lens (the so-called near portion, or segment) has a first side located on a lower side, and a second side. The first side has a height (thickness) that substantially smoothly changes so as to be connected to the surface of the distance lens. The second side has a step with respect to the surface of the distance lens.

Japanese Patent No. 3884945 discloses the following details. A transparent adhesive is applied onto an inner surface of an optical lens having an outer surface curve, thus forming a buffering resin layer on the inner surface of the optical lens. A transparent synthetic resin plate is adhered to the buffering resin layer. Thus, a see-through lens block is obtained that is made of a synthetic resin layer in which the transparent synthetic resin plate is joined in one piece to a glass layer with the buffering resin layer interposed therebetween. The synthetic resin layer of the lens block is subjected to curved surface polishing, thus producing a glass-resin laminated spectacle lens having a power (d) suitable for correcting a refractive error of a wearer.

At https://www.tokaiopt.info/corporate/technology/t08/, a spectacle (Franklin lens) is disclosed in which, when a spectacle lens is viewed in a front view in a worn state, a distance lens is disposed on the upper side of the spectacle lens, and a near lens is disposed on the lower side of the spectacle lens. Specifically, a spectacle for both near and distance visions is disclosed that is obtained by forming a total of four single focus lenses, namely, a right-eye distance lens, a left-eye distance lens, a right-eye near lens, and a left-eye near lens, cutting each of the lenses in half, and fitting and fixing the cut lenses into a frame.

JP 2010-191295A is an example of related art. Japanese Patent No. 3884945 is an example of related art.

The spectacle disclosed at https://www.tokaiopt.info/corporate/technology/t08/ is an example of related art.

SUMMARY OF THE INVENTION

In either JP 2010-191295A or Japanese Patent No. 3884945, it is necessary to form segments in order to realize near portions for seeing an object at a near distance. In either JP 2010-191295A or Japanese Patent No. 3884945, segments are raised from the object-side surface. In either JP 2010-191295A or Japanese Patent No. 3884945, the formation of a segment requires cutting a portion other than the segment, or preparing a mold in which a segment is formed, and forming an object-side surface.

According to https://www.tokaiopt.info/corporate/technology/t08/, a distance lens and a near lens are joined at their cross sections. Since the lenses are joined at their cross sections, the joined portion is present along the traveling direction (optical axis direction, or front-rear direction, described later) of a light beam. Accordingly, the joined portion is conspicuous, resulting in an impaired appearance. Consequently, an object cannot be viewed satisfactorily through the joined portion, leading to reduced wearability.

In either JP 2010-191295A or Japanese Patent No. 3884945, a semi-finished lens, which is a half-finished product, is normally prepared. For a semi-finished lens, a segment is formed in advance on the object-side surface, for example. The shape of the object-side surface is in a finished state, and the eyeball-side surface is in an unprocessed state (a plate or a concave surface having a predetermined curvature). Eventually, the unprocessed eyeball-side surface is processed, thus achieving a shape satisfying a prescription of the wearer of the spectacle lens.

In either JP 2010-191295A or Japanese Patent No. 3884945, a semi-finished lens equipped with a segment needs to be prepared separately from a commonly used, semi-finished lens without a segment, which is used for a single focus lens. This leads to an increase in the inventory of semi-finished lenses.

For a semi-finished lens equipped with a segment, a segment has been already formed, and thus it goes without saying that the position of the segment on the semi-finished lens cannot be changed.

On the other hand, when the spectacle lens is fitted to a spectacle frame (hereinafter also simply referred to as a "frame"), the position through which the line of sight of the wearer looking at an object at a predetermined distance passes within the frame changes according to a predetermined distance (infinity or a finite distance, and a specific value in the case of the finite distance). The predetermined distance is set as appropriate according to the assumed usage state (e.g., whether the spectacle lens is for desk work or for outdoor work) of the spectacle lens. The position of a near portion (e.g., the conventional segment) through which the line of sight of the wearer looking at an object at a distance closer than the predetermined distance changes according to the characteristics (e.g., the position of the line of sight in near vision) of the wearer and the usage state of the spectacle lens.

Depending on the shape of the frame to which the spectacle lens is (to be) fitted, a problem is envisaged that the positioning of the segment position will be difficult for the existing semi-finished lens. To address this problem, it is conceivable to prepare a semi-finished lens with a large-aperture segment so as to increase the degree of freedom of the position of the segment within the frame.

However, in this case, a semi-finished lens with a large-aperture segment is separately provided despite the fact that the inventory has been already increased as a result of using a semi-finished lens equipped with a segment. This leads to a further increase in the inventory. Even if only a semi-finished lens with a large-aperture segment is prepared, a total of two types of semi-finished lenses, including, a commonly used, semi-finished lens without a segment, which is used for a single focus lens, are still used, which inevitably leads to an increase in the inventory.

As described previously, in either JP 2010-191295A or Japanese Patent No. 3884945, the formation of a segment requires a cutting portion other than the segment, or preparing a mold in which a segment is formed, and forming an object-side surface. Accordingly, there is no degree of freedom of the position of the segment. Even if a semi-finished lens with a large-aperture segment is prepared, the degree of freedom of the position of the segment is lower than a case where the position of the segment can be freely set.

Besides a near portion in a bifocal lens, when a region with a specific optical function is desired to be formed inward of an outer edge of a spectacle lens, it is of significance to increase the degree of freedom associated with the position of that region.

An object of an embodiment of the present invention is to provide a spectacle lens in which a region with a specific optical function has a high degree of freedom, and that has a better appearance and a better field of view compared to those achieved when lenses are joined at their cross sections. In particular, an object thereof is to implement a multifocal spectacle lens in which a near portion has a high degree of freedom, and that supports a plurality of distances, without a conventional segment being provided.

An object of an embodiment of the present invention is to suppress an increase in the number of types of semi-finished lenses caused by the formation of a segment, and to increase the degree of freedom of a region with a specific optical function. In particular, an object thereof is to increase the degree of freedom of a near portion.

A first aspect of the present invention is a spectacle lens including
- a first lens and a second lens that are arranged overlapping each other in an optical axis direction,
- wherein the second lens has an opening, and
- the first lens covers the opening.

A second aspect of the present invention is the spectacle lens according to the first aspect,
- wherein the spectacle lens is a multifocal spectacle lens, and
- the multifocal spectacle lens includes a near portion corresponding to at least one near distance at the opening portion, and a distance portion corresponding to a distance farther than the near distance at a portion other than the opening and in which the second lens and the first lens overlap each other.

A third aspect of the present invention is the spectacle lens according to the second aspect,
- wherein the distance portion corresponds to one distance farther than the near distance.

A fourth aspect of the present invention is the spectacle lens according to any one of the first to third aspects,
- wherein the thickness of the second lens decreases toward an edge of the opening.

A fifth aspect of the present invention is the spectacle lens according to any one of the first to fourth aspects,
- wherein a ratio of an area of the first lens in a front view relative to an area of the spectacle lens in a front view as viewed from a direction of the optical axis direction in which the first lens is disposed is 0.60 or more.

A sixth aspect of the present invention is the spectacle lens according to any one of the first to fifth aspects,
- wherein, when a direction of an object that a wearer is looking at in the optical axis direction is an object side, and a direction opposite thereto is an eyeball side,
- the first lens is disposed on the object side, and the second lens is disposed on the eyeball side.

A seventh aspect of the present invention is the spectacle lens according to any one of the first to sixth aspects,
- wherein, when a direction of an object that a wearer is looking at in the optical axis direction is an object side, and a direction opposite thereto is an eyeball side,
- an eyeball-side surface of the first lens and an object-side surface of the second lens are both a spherical surface or a toroidal surface, and
- a curvature of the eyeball-side surface of the first lens and a curvature of the object-side surface of the second lens are equal.

An eighth aspect of the present invention is the spectacle lens according to any one of the first to seventh aspects,
- wherein the first lens and the second lens are joined to each other.

A ninth aspect of the present invention is a spectacle lens manufacturing method including:
- a lens obtaining step of obtaining, based on a prescription of a wearer, a first lens and a second lens that have been processed into predetermined shapes and that each have two main surfaces;
- an opening forming step of forming, based on information relating to the wearer, an opening at a predetermined position of the second lens; and,
- after the lens obtaining step and after the opening forming step, a joining step of joining the first lens and the second lens to each other so as to be arranged in an optical axis direction.

A tenth aspect of the present invention is the spectacle lens manufacturing method according to the ninth aspect,
- wherein the spectacle lens is a multifocal spectacle lens, and
- the multifocal spectacle lens includes a near portion corresponding to at least one near distance at the opening portion, and a distance portion corresponding to a distance farther than the near distance at a portion other than the opening and in which the second lens and the first lens overlap each other.

An eleventh aspect of the present invention is the spectacle lens manufacturing method according to the tenth aspect,
- wherein the distance portion corresponds to one distance farther than the near distance.

A twelfth aspect of the present invention is the spectacle lens manufacturing method according to any one of the ninth to eleventh aspects,
- wherein, in the opening forming step, the thickness of the second lens is decreased toward an edge of the opening.

A thirteenth aspect of the present invention is the spectacle lens manufacturing method according to any one of the ninth to twelfth aspects,
- wherein, in the joining step, a ratio of an area of the first lens in a front view relative to an area of the spectacle lens in a front view as viewed from a direction of the optical axis direction in which the first lens is disposed is set to 0.60 or more.

A fourteenth aspect of the present invention is the spectacle lens manufacturing method according to any one of the ninth to thirteenth aspects,
- wherein, when a direction of an object that a wearer is looking at in the optical axis direction is an object side, and a direction opposite thereto is an eyeball side,
- in the joining step, the first lens is disposed on the object side, and the second lens is disposed on the eyeball side.

A fifteenth aspect of the present invention is the spectacle lens manufacturing method according to any one of the ninth to fourteenth aspects,
- wherein, when a direction of an object that a wearer is looking at in the optical axis direction is an object side, and a direction opposite thereto is an eyeball side, an eyeball-side surface of the first lens and an object-side surface of the second lens are both processed into a spherical surface or a toroidal surface, and a curvature of the eyeball-side surface of the first lens and a curvature of the object-side surface of the second lens are made equal.

A sixteenth aspect of the present invention is the spectacle lens manufacturing method according to any one of the ninth to fifteenth aspects, wherein, in the lens obtaining step, the first lens is obtained by processing an unformed surface of a semi-finished lens, and the second lens is obtained by processing both surfaces of a semi-finished lens.

A seventeenth aspect of the present invention is a spectacle lens designing method including:

a lens designing step of designing a first lens and a second lens that have been processed into predetermined shapes and that each have two main surfaces so as to satisfy a prescription of a wearer when the first lens and the second lens are arranged overlapping each other in an optical axis direction; and an opening setting step of setting, based on information relating to the wearer, an opening at a predetermined position of the second lens.

An eighteenth aspect of the present invention is the spectacle lens designing method according to the seventeenth aspect, wherein the spectacle lens is a multifocal spectacle lens, and the multifocal spectacle lens includes a near portion corresponding to at least one near distance at the opening portion, and a distance portion corresponding to a distance farther than the near distance at a portion other than the opening and in which the second lens and the first lens overlap each other.

A nineteenth aspect of the present invention is the spectacle lens designing method according to the eighteenth aspect, wherein the distance portion corresponds to one distance farther than the near distance.

A twentieth aspect of the present invention is the spectacle lens designing method according to any one of the seventeenth to nineteenth aspects, wherein, in the opening setting step, the thickness of the second lens is decreased toward an edge of the opening.

A twenty-first aspect of the present invention is the spectacle lens designing method according to any one of the seventeenth to twentieth aspects, wherein, when a direction of an object that a wearer is looking at in the optical axis direction is an object side, and a direction opposite thereto is an eyeball side, an eyeball-side surface of the first lens and an object-side surface of the second lens are both designed in a spherical surface or a toroidal surface, and a curvature of the eyeball-side surface of the first lens and a curvature of the object-side surface of the second lens are made equal.

A twenty-second aspect of the present invention is a spectacle obtained in which the spectacle lens according to any one of the first to eighth aspects is fitted into a frame in a state in which the spectacle lens is cut into a predetermined shape.

Other aspects of the present invention that can be combined with the above-described aspects are as follows.

The shape of the opening in a front view is not limited, and may be a true circular shape or an elliptic shape (collectively a circular shape). In the case of an elliptic shape, the horizontal direction when the spectacle lens is worn may be a major axis, and the up-down direction when the spectacle lens is worn may be a minor axis, or vice versa. The opening may be disposed so as to be enclosed within the region of the first lens, or may be disposed in a shape in which the circular shape is in contact with an outer edge of the first lens, or a part of the circular shape is cut off by an outer edge of the first lens. The opening may have a shape surrounded by a convex curve. For example, the opening may have, on an outer periphery thereof, a circular arc with a radius of curvature (or an approximate radius of curvature) of 5 mm or more.

The size of the opening may be such that the diameter of the inscribed circle (in the case of a true circular shape, the diameter thereof) is about 5 to 25 mm in a front view, for example. A diameter in this range is greater than or equal to the pupil diameter of a person when the pupil is dilated, and therefore the second lens functions effectively.

The first lens may be a so-called plus lens, in which case the second lens may be a minus lens.

It is preferable that the second lens has a thickness that decreases toward an edge of the opening. Even if a step is present, it is preferable that the height of the step in the optical axis direction is 0.50 mm or less (preferably 0.30 mm or less, and more preferably 0.10 mm or less).

More preferably, the thickness of the second lens gradually decreases toward the opening, and the position at which the thickness becomes 0 constitutes the edge of the opening. In this case, the object-side surface of the second lens and the eyeball-side surface of the first lens are smoothly connected at the edge of the opening.

When the optical axis direction is a Z-axis direction, and the Z-coordinate of the eyeball-side surface is a sag value (with the lens center serving as an origin), it is preferable that the ratio (ratio 1) of the absolute value of the increase/decrease amount (unit:mm) of the sag value relative to the distance (unit:mm) in any direction perpendicular to the Z axis is suppressed to 5.00 or less at most (preferably 3.00 or less, and more preferably 1.00 or less). Any direction perpendicular to the Z axis is an X direction or a Y direction, for example, assuming that the horizontal direction and the up-down direction when the spectacle lens is worn are the X direction and the Y direction, respectively. It is preferable that the above-described ratio 1 falls within the above-described range in both the X direction and the Y direction.

The above-described specifications regarding the step may be applied not only to a portion corresponding to the opening, but also to the entire object-side surface and the entire eyeball-side surface of the multifocal spectacle lens.

It is preferable that the thickness decrease ratio (thickness decrease amount (unit:mm)/the distance (unit:mm)) in a direction extending toward the opening center (center of gravity when the center is difficult to define) (ratio 2) when the thickness decreases toward the edge of the opening is 1.00 or less (preferably 0.50 or less, and more preferably 0.30 or less).

It is preferable that the ratio (ratio 3) of the area (unit:cm$^2$) of the first lens in a front view relative to the area (unit:cm$^2$) of the multifocal spectacle lens in a front view as viewed from a direction of the optical axis direction in which the first lens is disposed is 0.60 or more (preferably 0.70 or more, more preferably 0.80 or more, further preferably 0.90 or more, and particularly preferably 1.00). The outer edge of the first lens may traverse within the region of the spectacle lens when the ratio 3 is less than 1.00.

It is preferable that the raw materials of lens substrates of the first lens and the second lens are of the same type.

The base curve, which provides a near power, of the object-side surface of the first lens may be determined by a distance power (spherical power S).

According to an embodiment of the present invention, it is possible to provide a spectacle lens in which a region with a specific optical function has a high degree of freedom, and that has a better appearance and a better field of view compared to those achieved when lenses are joined at their cross sections. In particular, it is possible to implement a multifocal spectacle lens in which a near portion has a high degree of freedom, and that supports a plurality of distances, without a conventional segment being provided.

According to an embodiment of the present invention, it is possible to suppress an increase in the number of types of semi-finished lenses caused by the formation of a segment, and to increase the degree of freedom of a region with a specific optical function. In particular, it is possible to increase the degree of freedom of a near portion.

BRIEF DESCRIPTION OF THE DRAWINGS

FIGS. 1A to 1E are schematic diagrams of a bifocal lens according to Embodiment 1, wherein FIG. 1A is a front view, FIG. 1B is a side view as viewed from the Y direction in FIG. 1A, FIG. 1C is a side view as viewed from the X direction in FIG. 1A, FIG. 1D is a perspective view, and FIG. 1E is a cross-sectional view taken along the line A-A in FIG. 1A.

FIGS. 2A to 2E are schematic diagrams of a bifocal lens according to Embodiment 2, wherein FIG. 2A is a front view, FIG. 2B is a side view as viewed from the Y direction in FIG. 2A, FIG. 2C is a side view as viewed from the X direction in FIG. 2A, FIG. 2D is a perspective view, and FIG. 2E is a cross-sectional view taken along the line A-A in FIG. 2A.

FIGS. 3A to 3E are schematic diagrams of a bifocal lens according to Embodiment 3, wherein FIG. 3A is a front view, FIG. 3B is a side view as viewed from the Y direction in FIG. 3A, FIG. 3C is a side view as viewed from the X direction in FIG. 3A, FIG. 3D is a perspective view, and FIG. 3E is a cross-sectional view taken along the line A-A in FIG. 3A.

FIGS. 4A to 4D are schematic diagrams of a first lens according to Embodiment 3, wherein FIG. 4A is a front view, FIG. 4B is a side view as viewed from the Y direction in FIG. 4A, FIG. 4C is a side view as viewed from the X direction in FIG. 4A, and FIG. 4D is a perspective view.

FIGS. 5A to 5D are schematic diagrams of a second lens according to Embodiment 3, wherein FIG. 5A is a front view, FIG. 5B is a side view as viewed from the Y direction in FIG. 5A, FIG. 5C is a side view as viewed from the X direction in FIG. 5A, and FIG. 5D is a perspective view.

FIGS. 6A to 6E are schematic diagrams of a bifocal lens according to Embodiment 4, wherein FIG. 6A is a front view, FIG. 6B is a side view as viewed from the Y direction in FIG. 6A, FIG. 6C is a side view as viewed from the X direction in FIG. 6A, FIG. 6D is a perspective view, and FIG. 6E is a cross-sectional view taken along the line A-A in FIG. 6A.

FIGS. 7A to 7E are schematic diagrams of a bifocal lens according to Embodiment 5, wherein FIG. 7A is a front view, FIG. 7B is a side view as viewed from the Y direction in FIG. 7A, FIG. 7C is a side view as viewed from the X direction in FIG. 7A, FIG. 7D is a perspective view, and FIG. 7E is a cross-sectional view taken along the line A-A in FIG. 7A.

FIGS. 8A to 8E are schematic diagrams of a bifocal lens according to Embodiment 6, wherein FIG. 8A is a front view, FIG. 8B is a side view as viewed from the Y direction in FIG. 8A, FIG. 8C is a side view as viewed from the X direction in FIG. 8A, FIG. 8D is a perspective view, and FIG. 8E is a cross-sectional view taken along the line A-A in FIG. 8A.

FIG. 9A to 9D are schematic diagrams of a first lens according to Embodiment 6, wherein FIG. 9A is a front view, FIG. 9B is a side view as viewed from the Y direction in FIG. 9A, FIG. 9C is a side view as viewed from the X direction in FIG. 9A, and FIG. 9D is a perspective view.

FIG. 10A to 10D are schematic diagrams of a second lens according to Embodiment 6, wherein FIG. 10A is a front view, FIG. 10B is a side view as viewed from the Y direction in FIG. 10A, FIG. 10C is a side view as viewed from the X direction in FIG. 10A, and FIG. 10D is a perspective view.

DETAILED DESCRIPTION OF THE INVENTION

Figure 1A:
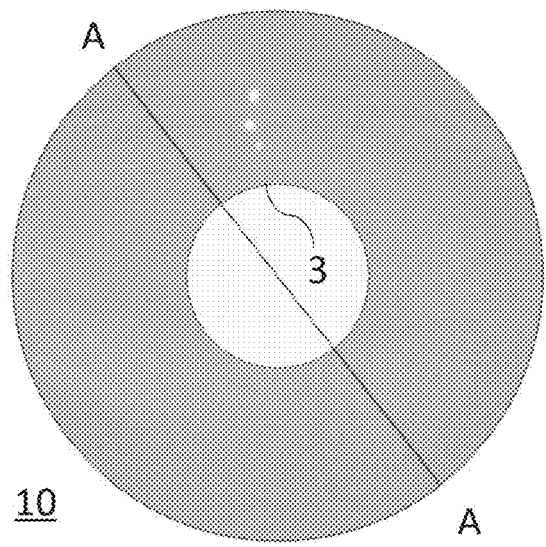

Hereinafter, an aspect of the present invention will be described. The term "to" as used in the present specification refers to a predetermined value or more and a predetermined value or less.

<Spectacle Lens>

The spectacle lens as described in the present specification has an object-side surface and an eyeball-side surface. The term "object-side surface" refers to a surface located on the object side when a spectacle including a spectacle lens is worn by a wearer, and the term "eyeball-side surface" refers to a surface located opposite thereto, or in other words, on the eyeball side when the spectacle including the spectacle lens is worn by the wearer. This relationship also applies to a lens substrate from which the spectacle lens is formed. That is, the lens substrate also has an object-side surface and an eyeball-side surface.

An embodiment of the present invention is a multifocal spectacle lens. The term "multifocal" as used in the present specification includes not only a so-called bifocal lens, but also a so-called trifocal lens. The number of focal points is not limited as long as the number is two or more. As an example, a bifocal lens will be described in the following. A method for implementing a trifocal lens will be described later.

A bifocal lens is composed of a distance portion in which a power suitable for an object located at one predetermined distance away from the wearer is set, and a near portion in which a power suitable for an object located at one near distance closer than the predetermined distance is set.

The distance portion is not particularly limited as long as it is a region for viewing a distance farther than the near distance. For example, the distance portion may be infinity, or may be a region for viewing a predetermined distance (about 1 m).

Examples of the spectacle lens including such a region include an intermediate-near lens corresponding to an object distance of an intermediate distance (1 m to 40 cm) to a near distance (40 cm to 10 cm), and a near-near lens corresponding to the near distance.

A multifocal spectacle lens according to an embodiment of the present invention includes a first lens and a second lens that are arranged overlapping each other in an optical axis direction. The term "optical axis direction" as used in the present specification corresponds to the direction of the normal at the center of the object-side surface and the eyeball-side surface of the multifocal spectacle lens. The optical axis direction is also the thickness direction of the spectacle lens, and is the front-rear direction as viewed from the wearer. That is, in an embodiment of the present invention, the placement of the first lens and the placement of the second lens are in a forward/rearward relation with each other.

The term "center" described in the above paragraph is also referred to as a "lens center". The term "lens center" refers to a geometrical center, an optical center, or a centering center of the spectacle lens. In the present specification, a centering center is described as an example. In the present specification, a case where the visual axis passes through the lens center when the wearer is looking forward is described as an example.

As in the case where two main surfaces are present on an ordinary spectacle lens, two main surfaces are present on the first lens (e.g., FIGS. 4A to 4D and 9A to 9D described below), and a lens center can be defined. Two main surfaces are also present on the second lens (e.g., FIGS. 5A to 5D and 10A to 10D described below), and a lens center can be defined.

The second lens has an opening extending through the two main surfaces. The term "opening" as used in the present specification means a through hole (a so-called closed opening) whose perimeter is surrounded by the lens substrate of the second lens.

Also, the first lens covers the opening. The expression "covers the opening" as used in the present specification refers to a state in which the opening is thoroughly covered by the first lens when the opening is viewed front-on, or in other words, when the multifocal spectacle lens is viewed in a front view from a direction of the optical axis direction in which the first lens is disposed. The expression "covers the opening" may be rephrased as a state in which the opening is covered.

For example, reference numeral 1 in FIGS. 3A to 3E described below denotes the first lens, reference numeral 2 denotes the second lens, and reference numeral 3 denotes the opening. In the bifocal lens denoted by reference numeral 10, the opening 3 of the second lens 2 is covered by the first lens 1. Hereinafter, the reference numerals will be omitted for the sake of convenience of description.

The term "front view" as used in the present specification refers to a state in which the spectacle lens or the spectacle is viewed in a direction extending from the front toward the rear in the optical axis direction. The term "portion in which the first lens and the second lens overlap each other" refers to a portion in which the two lenses overlap each other as viewed in a front view.

The shape of the opening in a front view is not limited, and may be a true circular shape or an elliptic shape (collectively a circular shape), or may be a substantially semicircular shape (with a bottom side in the form of a circular arc, and a top side in the form of a horizontal line) as in the case of a segment of a conventional bifocal lens. In the case of an elliptic shape, the horizontal direction when the spectacle lens is worn may be a major axis, and the up-down direction when the spectacle lens is worn may be a minor axis, or vice versa. The opening may be disposed so as to be enclosed within the region of the first lens, or may be disposed in a shape in which the circular shape is in contact with an outer edge of the first lens, or a part of the circular shape is cut off by an outer edge of the first lens. The opening may have a shape surrounded by a convex curve. For example, the opening may have, on an outer periphery thereof, a circular arc with a radius of curvature (or an approximate radius of curvature) of 5 mm or more.

The size of the opening is not limited, and the diameter of the inscribed circle in a front view may be about 5 to 25 mm, for example. A diameter in such a range is greater than or equal to the pupil diameter of a person when the pupil is dilated, and therefore the second lens functions effectively.

The mode in which the first lens and the second lens overlap each other is not limited. For example, the two lenses may be attached to each other with an optical film such as a polarizing film or a photochromic film interposed between the two lenses. At that time, the optical film may or may not be interposed so as to include the opening. Even if the optical film is interposed so as to include the opening, it is preferable that a hard coating film is formed on both sides of the multifocal spectacle lens in that state.

The positional relation between the two lenses may be fixed by attaching adhesive tape or the like to side surfaces of the two lenses while providing a slight gap between the two lenses. It is preferable that the gap is 1.0 mm or less (preferably 0.5 mm or less, more preferably 0.3 mm or less, and particularly preferably 0.1 mm or less) in the front-rear direction. The two lenses may, of course, be directly attached to each other without any gap therebetween. That is, it is preferable that the first lens and the second lens are arranged in the optical axis direction, and have surfaces that at least partially overlap each other. Hereinafter, this example will be described. Attachment described in this paragraph and the previous paragraph may also collectively be referred to as "joining".

The mode of joining is also not limited, and the two lenses may be fixed to each other using an adhesive or the like. At that time, the entirety of the two lenses may be fixed to each other, or only peripheral edges of the two lenses may be fixed to each other. The two lenses may be fixed to each other by applying a photocurable resin between the two lenses, or the two lenses may be joined using a thermosetting resin or a thermoplastic resin.

There is no limitation as to which of the first lens and the second lens is on the front side. However, when the second lens having the opening is disposed on the rear side, and the first lens is disposed on the front side so as to cover the opening, no step will be formed at a front portion corresponding to the opening on the object-side surface, which significantly affects the appearance. That is, it is preferable that the eyeball-side surface of the first lens and the object-side surface of the second lens are at least partially attached to or closely in contact with each other so as to form one spectacle lens. Accordingly, in the present specification, the above example in this paragraph is mainly described.

In the multifocal spectacle lens according to an embodiment of the present invention, the opening portion is a near portion corresponding to at least one near distance (one near distance for a bifocal lens, and two near distances for a trifocal lens).

That is, when the multifocal spectacle lens is worn, the visual axis to an object located at the near distance passes through the opening. A near visual point, which is an intersection point between the eyeball-side surface of the multifocal spectacle lens and the visual axis to the object located at the near distance, is disposed within the opening. The near visual point and the opening center (center of gravity when the center is difficult to define) may be made to coincide with each other.

In the multifocal spectacle lens, a portion other than the opening and in which the first lens and the second lens overlap each other is a distance portion corresponding to a distance farther than the near distance.

The refraction direction of a light beam that passes through the opening without coming into contact with the second lens is affected only by the surface shape of the first lens. That is, the power (near power) of the near portion of the multifocal spectacle lens is determined solely by the first lens.

This means that, by setting the position, the size, the shape of the opening of the second lens in a front view, or the like (hereinafter also referred to as a "position or the like"), a near portion for which any position or the like is set can be formed. This is also referred to as "and also a near portion with a high degree of freedom". Furthermore, the two lenses can simply overlap each other in the front-rear direction, without the need to join the lenses to each other at their cross sections as in the case of https://www.tokaiopt.info/corporate/technology/t08/.

As a result, according to an embodiment of the present invention, it is possible to provide a multifocal spectacle lens that has a better appearance and a better field of view than those achieved when lenses are joined to each other at their cross sections, and also a near portion with a high degree of freedom, without a conventional segment being provided.

The distance portion according to an embodiment of the present invention is formed by a portion in which the first lens and the second lens overlap each other. There is no limitation on the power that is set for the distance portion as long as the power can correspond to a distance farther than the near distance (i.e., the above-described predetermined distance). In the case of a bifocal lens, this power corresponds to a distance power (spherical power), and is constant in the portion in which the second lens and the first lens overlap each other. The distance power as used in the present specification refers to a power for viewing an object located at the above-described predetermined distance (including infinity).

On the other hand, the power need not have a single value throughout the distance portion. For example, in the distance portion, the power may be set such that the power keeps decreasing continuously from the near power in a direction away from the near portion. At this time, a prescription (spherical power S) may be realized at the distance visual point. However, it is preferable that the power has a single value throughout the distance portion as this will reduce distortion and blurring.

A method for implementing the distance portion is as follows. As described above, the near power is achieved by the first lens. A shape that reduces the near power provided by the first lens may be used for a portion of the second lens other than the opening.

Specifically, the shape of a surface (in this example, the outermost surface on the eyeball side of the multifocal spectacle lens) of the second lens that faces a surface (hereinafter a "joining surface") on which the second lens and the first lens overlap each other may be formed such that, when combined with the shape of a surface (in this example, the outermost surface on the object side of the multifocal spectacle lens) of the first lens that faces the joining surface, the power decreases from the near power to a certain power. By reflecting this shape on the portion other than the opening, the power is of a single value throughout the distance portion.

If the refractive power (hereinafter described using the term "power" for the sake of convenience of description) provided by the shapes of the two main surfaces is plus when viewing is performed through the first lens alone, the second lens has a minus power when viewing is performed through the second lens alone. That is, the first lens may be a so-called plus lens, in which case the second lens may be a minus lens.

In an embodiment of the present invention, the near portion is realized by the first lens alone, whereas the distance portion is realized as a result of the first lens and the second lens overlapping each other. In other words, in an embodiment of the present invention, the near portion is realized by the shapes of the two main surfaces of the first lens alone, whereas the distance portion is realized by one of the main surfaces of the first lens (the object-side surface of the first lens when joined) and one of the main surfaces of the second lens (the eyeball-side surface of the second lens when joined).

For the sake of convenience of description, the expressions "the object-side surface of the first lens", "the eyeball-side surface of the first lens", "the object-side surface of the second lens", and "the eyeball-side surface of the second lens" are used, which are expressions assuming the joined state.

A near power is set by adding a certain power to a distance power. In the present specification, this power is referred to as an addition power. Addition power is usually a term used for a progressive power lens, but is used here for the sake of convenience of description.

In an embodiment of the present invention, the distance power is set by decreasing the near power of the near portion, which is realized by the first lens alone, by an amount corresponding to the addition power (i.e., by giving a negative addition power to the near power) by combining the second lens with the first lens.

It is preferable that the second lens has a thickness that decreases toward the edge of the opening. With this configuration, substantially no step is produced by the opening on the eyeball-side surface when the first lens and the second lens are joined with the first lens disposed on the front side and the second side disposed on the rear side. Even if a step is present, it is preferable that the height of the step in the optical axis direction is 0.50 mm or less (preferably 0.30 mm or less, and more preferably 0.10 mm or less).

More preferably, the thickness of the second lens gradually decreases toward the opening, and the position at which the thickness becomes 0 constitutes the edge of the opening. In this case, the object-side surface of the second lens and the eyeball-side surface of the first lens are smoothly connected at the edge of the opening.

To express the specifications regarding the step in another mode, when the optical axis direction is a Z-axis direction, and the Z-coordinate of the eyeball-side surface is a sag value (with the lens center serving as an origin), it is preferable that the ratio (hereinafter "ratio 1") of the absolute value of the increase/decrease amount (unit:mm) of the sag value relative to the distance (unit:mm) in any direction perpendicular to the Z axis is suppressed to 5.00 or less at most (preferably 3.00 or less, and more preferably 1.00 or less). Any direction perpendicular to the Z axis is an X direction or a Y direction, for example, assuming that the horizontal direction and the up-down direction when the spectacle lens is worn are the X direction and the Y direction, respectively. It is preferable that the above-described ratio 1 falls within the above-described range in both the X direction and the Y direction.

The above-described specifications regarding the step may be applied not only to a portion corresponding to the opening, but also to the entire object-side surface and the entire eyeball-side surface of the multifocal spectacle lens.

It is preferable that the thickness decrease ratio (thickness decrease amount (unit:mm)/the distance (unit:mm)) in a direction extending toward the opening center (center of gravity when the center is difficult to define) (hereinafter "ratio 2") when the thickness decreases toward the edge of the opening is 1.00 or less (preferably 0.50 or less, and more preferably 0.30 or less). With a decrease in the ratio 2, the edge becomes sharper, and has a so-called knife edge shape. Accordingly, a step is less likely to be formed.

When the ratio (hereinafter "ratio 3") of the area (unit: $cm^2$) of the first lens in a front view relative to the area (unit:$cm^2$) of the multifocal spectacle lens in a front view as viewed from a direction of the optical axis direction in which the first lens is disposed is small, the thickness of the multifocal spectacle lens in the vicinity of the opening can be set small. On the other hand, if the ratio 3 is too small, the distance portion cannot be sufficiently secured. If securing the distance portion is regarded as being important, it is preferable the ratio 3 is 0.60 or more (preferably 0.70 or more, more preferably 0.80 or more, further preferably 0.90 or more, and particularly preferably 1.00). The outer edge of the first lens may traverse within the region of the spectacle lens when the ratio 3 is less than 1.00.

When the edge of the opening has a knife edge shape, the joining interface (joining surface) with the first lens has a shape that does not extend along the optical axis direction, but rather along the object-side surface or the eyeball-side surface of the multifocal spectacle lens. Accordingly, the first lens and the second lens can be smoothly joined, and the joining interface therebetween is less conspicuous as compared with a case where the joined portion extends along the optical axis direction as in the case described at https://www.tokaiopt.info/corporate/technology/t08/. Even if the joining interface is visible, it is possible to make the joining interface invisible by forming a hard coating film.

The larger the ratio 3, the closer the joining interface between the first lens and the second lens in a front view is to a peripheral edge of the multifocal spectacle lens. This contributes to an improved appearance and a better field of view as compared with the case where the above-described interface is close to the lens center. From this viewpoint as well, the above-described preferable range of the ratio 3 is of significance.

The joining interface (joining surface) between the first lens and the second lens, or in other words, the eyeball-side surface of the first lens and the object-side surface of the second lens of the multifocal spectacle lens are both preferably a spherical surface or a toroidal surface, and the curvatures of the two surfaces are preferably equal. When the joining interface is a spherical surface or a toroidal surface, the lenses can be easily processed, which is advantageous in terms of manufacturing. Curvatures being equal means that the difference between the two radii of curvature is ±5% or less (preferably ±1% or less).

The object-side surface (outermost surface) and the eyeball-side surface (outermost surface) of the multifocal spectacle lens that face the joining surface may have the shape of a spherical surface or a toroidal surface, or may have the shape of an aspherical surface (e.g., a rotationally symmetric aspherical surface).

There is no limitation on the raw materials of the lens substrates of the first lens and the second lens. The raw materials of the two lens substrates may be different from each other. For example, the two lens substrates may have refractive indexes different from each other. However, in the case of using different types of raw materials, the number of types of semi-finished lenses needs to be increased. Therefore, in view of the inventory of semi-finished lenses alone, it is preferable that the two lens substrates are of the same type.

The technical scope of the present invention is not limited to the embodiments described above, but includes various changes and modifications as far as specific effects achieved by the constituent elements of the invention and combinations thereof can be derived.

An embodiment of the present invention is not limited to a near portion of a bifocal lens, but is also applicable to a case where a region with a specific optical function is desired to be provided inward of an outer edge of a spectacle lens. For example, a film having an optical function may be formed only on the opening.

A single focus lens may be obtained by joining the first lens and the second lens. As will also be described in <Spectacle Lens Manufacturing Method> below, even a semi-finished lens unsuitable for producing a single focus lens having a predetermined power can be utilized to prepare the first lens and the second lens, and eventually a single focus lens satisfying a prescription can be produced.

A trifocal lens may be obtained. In that case, it is preferable to prepare a third lens. The third lens overlaps (e.g., is joined to) the first lens and the second lens in the optical axis direction, thus constituting a multifocal spectacle lens.

As an example, the first lens is located on the outermost surface on the object side, and the second lens is located on the rear side of the first lens, as described in an embodiment of the present invention. Also, the third lens has an additional opening that is concentric to the opening of the second lens in the multifocal spectacle lens.

The additional opening may have any shape provided that the shape is not completely the same as that of the opening of the second lens. For example, a case is assumed where the opening of the third lens is smaller than the opening of the second lens. In this case, the power of a portion corresponding to the opening of the third lens, the power of a portion located between the opening of the third lens and the opening of the second lens, and the power of a portion other than the opening of the second lens can be set in the multifocal spectacle lens. That is, in this case, the multifocal spectacle lens is a trifocal lens. By applying this principle, it is also possible to implement a quadrifocal or pentafocal spectacle lens.

<Spectacle>

The technical idea of the present invention is also reflected in a spectacle obtained by cutting, according to a predetermined frame shape, the vicinity of a peripheral edge of a spectacle lens including a first lens and a second lens that are arranged overlapping each other in an optical axis direction, wherein the second lens has an opening, and the first lens covers the opening, and fitting the spectacle lens into a frame. There is no limitation on the type, shape, and the like of the frame, and the frame may be a full-rim, half-rim, under-rim, or rimless frame <Spectacle Lens Manufacturing Method>

The present invention is also applicable to a spectacle lens manufacturing method. Specific examples of embodiments thereof include the following. In the following, the details redundant to the details described in <Spectacle Lens> are omitted as appropriate.

"A spectacle lens manufacturing method including: a lens obtaining step of obtaining, based on a prescription of a wearer, a first lens and a second lens that have been processed into predetermined shapes and that each have two main surfaces; and an opening forming step of forming, based on information relating to the wearer, an opening at a predetermined position of the second lens; and a joining step of joining the first lens and the second lens to each other so as to be arranged in an optical axis direction."

In the lens obtaining step, a first lens and a second lens are obtained. There is no limitation on the means for obtaining the lenses. For example, a first lens and a second lens that do not require processing of surface shapes other than the formation of an opening may be prepared in advance.

For example, semi-finished lenses may be prepared in advance that achieve a distance power when an object-side surface of the first lens and an eyeball-side surface of the second lens are combined, and achieve a near power with the two main surfaces of the first lens. The near power and the distance power can be freely set by combining semi-finished lenses.

Specifically, the distance power can be freely set by combining an object-side surface of a semi-finished lens used for the first lens and an eyeball-side surface of a semi-finished lens used for the second lens. The near power can be freely set by two main surfaces of the semi-finished lens used for the first lens.

The base curve, which provides the near power, of the object-side surface of the first lens may be determined by the distance power (spherical power S). Once again, in an embodiment of the present invention, the distance power is set by giving a negative addition power to the near power of a near portion realized by the first lens alone. Accordingly, a semi-finished lens having, as an object-side surface thereof, a base curve that can correspond to a predetermined distance power and a predetermined addition power that are to be set may be selected for the first lens.

It is preferable that surfaces (the eyeball-side surface of a semi-finished lens used for the first lens and the object-side surface of a semi-finished lens used for the second lens) that are to constitute a joining surface are processed such that the shapes of the two surfaces match. The aforementioned shapes are preferably the shape of a spherical surface or a toroidal surface.

If the shapes of the two surfaces match, a certain level of joining strength can be ensured when the two surfaces overlap each other without using any adhesive. On the other hand, it is preferable to use an adhesive in view of the strength of the multifocal spectacle lens. Even if the shapes of the two surfaces do not match completely, the gap therebetween can be filled with an adhesive. The use of an adhesive allows for a difference in shapes between the two surfaces.

On the other hand, according to the technical idea of the present invention, there is room for reduction in the number of types of semi-finished lenses, as will be described below. In an embodiment of the present invention, this benefit may be utilized. In the following, this will be described in line with the example of the embodiment of the present invention described in
<Spectacle Lens>.

The first lens is disposed forward of the second lens, and covers the opening of the second lens. A portion in which the first lens and the second lens overlap each other in a front view constitutes a distance portion. The distance power in the distance portion is determined by the shape of the object-side surface of the first lens and the shape of the eyeball-side surface of the second lens. The near power in the near portion is determined by a portion of the first lens that overlaps the opening of the second lens.

Accordingly, a semi-finished lens on which the object-side surface of the two main surfaces of the first lens has been formed in advance may be used. In view of the fact that the near power is achieved by the first lens alone, it is possible to use an existing semi-finished lens (without a segment) for a single focus lens. This eliminates the need to excessively increase the number of types of semi-finished lenses for the first lens according to an embodiment of the present invention.

An unformed surface facing the formed surface of the semi-finished lens for the first lens is processed so as to constitute a joining surface with the second lens. The shape of the unformed surface is not limited, and may be a plate shape. However, in order to reduce the processing amount, it is preferable to use a semi-finished lens that has an unformed surface having a shape similar to that of a joining surface to be formed.

In terms of manufacturing, it is advantageous that the unformed surface after processing has the shape of a spherical surface or a toroidal surface for both the eyeball-side surface of the first lens and the object-side surface of the second lens, as described previously in <Spectacle Lens>. At this time, it is preferable that the curvature of the eyeball-side surface of the first lens and the curvature of the object-side surface of the second lens are made equal.

When the thickness of the second lens decreases toward the edge of the opening, the object-side surface of the second lens is formed according to the mode of the decrease. It is preferable that the eyeball-side surface of the first lens is formed according to the mode of the formation thereof.

The two main surfaces of the second lens may both be processed. The eyeball-side surface of the second lens may be processed into a shape that achieves a distance power when overlapping the object-side surface of the first lens. When the thickness of the second lens decreases toward the edge of the opening, the object-side surface of the second lens may be processed into a shape conforming to the mode of that decrease.

When producing the second lens, it is possible to use a semi-finished lens having, on one main surface thereof, a shape similar to the shape that achieves the above-described distance power, or use a plate whose two main surfaces are both unprocessed. In most cases, the second lens is subjected to processing to form an opening. Accordingly, even if a semi-finished lens is used, the shapes of the two main surfaces of the semi-finished lens must be changed.

However, this, in other words, means that there is room to allow the second lens to be produced using a surplus semi-finished lens, or a rejected semi-finished lens whose formed surface is deviated from the envisioned shape. By extension, this means that there is room to allow the second lens to be produced using a semi-finished lens of the same type as that used for the first lens.

Once again, the position or the like of the opening can be freely set according to information relating to the wearer, and openings having different positions or the like can be formed from one type of semi-finished lens.

A high degree of freedom in selection of the semi-finished lens for the second lens, and also a high degree of freedom in setting of the position or the like of the opening as described in <Spectacle Lens> may lead to clearing an inventory of semi-finished lenses.

As described in <Spectacle Lens>, the eyeball-side surface of the first lens may be processed such that the power thereof is plus when viewing is performed through the first lens alone, or such that the first lens is a plus lens. In that case, both surfaces of the second lens may be processed such that the power thereof is minus when viewing is performed through the second lens alone, or such that the second lens is a minus lens.

In an embodiment of the present invention, for an astigmatic power and an astigmatic axis included in a prescription, a semi-finished lens corresponding to the astigmatic power and the astigmatic axis may be prepared in advance. However, in the sense of reducing the number of types of semi-finished lenses, it is preferable that the astigmatic power and the astigmatic axis are realized by processing the eyeball-side surface of the second lens.

In the opening forming step, an opening is formed at a predetermined position of the second lens based on information relating to the wearer. When the multifocal spectacle lens is worn, the visual axis to an object located at a near distance passes through the opening.

The information relating to the wearer is wearer parameters including a prescription. The contents of the prescription include a spherical power S, an astigmatic power C, an astigmatic axis Ax, and an addition power ADD. For example, even when the addition power ADD is the same for a wearer α and a wearer β, if the spherical power S and the astigmatic power C are different between the wearer α and the wearer β, the position of the opening of the multifocal spectacle lens for the wearer α is different from the position of the opening of the multifocal spectacle lens for the wearer β. The size of the opening may be determined according to the request from the wearer.

Examples of wearer parameters other than a prescription include an inward adjustment amount when the wearer views a near distance, and the position or the like of a near visual point.

The processing for shaping the edge of the opening into a knife edge shape may be performed during the opening forming step. The processing step for the object-side surface of the second lens and the processing step for the eyeball-side surface of the second lens may be performed together during the opening forming step. That is, for at least the second lens, the step of obtaining the second lens that has been processed into a predetermined shape and that has two main surfaces, and the opening forming step may be performed simultaneously based on a prescription of the wearer. Separately from these steps, the processing step for the eyeball-side surface of the first lens may be performed such that the eyeball-side surface of the first lens has a curvature equal to the curvature of the object-side surface of the second lens (i.e., the first lens obtaining step).

In the joining step, when the first lens is disposed on the object side, and the second lens is disposed on the eyeball side, the formed surface of the semi-finished lens may be directly used as the object-side surface of the first lens. On the other hand, in the case of an arrangement that is the reverse of that of an embodiment of the present invention, or in other words, when the second lens is disposed on the object side and the first lens is disposed on the eyeball side, a formed surface of the semi-finished lens may be directly used as the eyeball-side surface of the first lens. That is, in the lens obtaining step, the first lens may be obtained by processing only an unformed surface of a semi-finished lens, and the second lens may be obtained by processing both surfaces of a semi-finished lens.

In the joining step, after the lens obtaining step and after the opening forming step, the first lens and the second lens are joined so as to be arranged in the optical axis direction. That is, the first lens and the second lens are disposed at predetermined opposing positions so as to at least partially overlap each other, and are joined to each other. At that time, as described in the previous paragraph, the two lenses are joined such that the visual axis passes through the opening of the second lens in near vision. The type of the adhesive used for joining is not limited, but the adhesive and hence the joining surface between the two lenses will not be conspicuous when a raw material having a refractive index close to the refractive index of the raw material of the first lens and/or the second lens is used.

The processing of the first lens and the second lens can be sufficiently performed using a known lens processing machine.

According to an embodiment of the present invention, it is possible to suppress an increase in the number of types of semi-finished lenses caused by the formation of a segment, and to increase the degree of freedom of a region with a specific optical function. In particular, it is possible to increase the degree of freedom of a near portion.

<Spectacle Lens Designing Method>

The present invention is also applicable to a spectacle lens designing method. Specific examples of embodiments thereof include the following. In the following, the details redundant to the details described in <Spectacle Lens> and <Spectacle Lens Manufacturing Method> are omitted as appropriate.

"A spectacle lens designing method including:
a lens designing step of designing a first lens and a second lens that have been processed into predetermined shapes and that each have two main surfaces so as to satisfy a prescription of a wearer when the first lens and the second lens are arranged overlapping each other in an optical axis direction; and
an opening setting step of setting, based on information relating to the wearer, an opening at a predetermined position of the second lens."

In the lens setting step, the details of the lens obtaining step described in <Spectacle Lens Manufacturing Method> can be used. That is, the distance power in the distance portion can be determined by the shape of the object-side surface of the two main surfaces of the first lens, and the shape of the eyeball-side surface of the two main surfaces of the second lens. In addition, the near power in the near portion can be determined by a portion of the first lens that overlaps the opening of the second lens.

The details of the opening forming step described in <Spectacle Lens Manufacturing Method> can be used for the opening setting step.

According to an embodiment of the present invention, it is possible to suppress an increase in the number of types of semi-finished lenses caused by the formation of a segment, and to increase the degree of freedom of a region with a specific optical function. In particular, it is possible to increase the degree of freedom of a near portion.

EMBODIMENTS

The present invention will be described in detail below by way of embodiments. The present invention is not limited to the following embodiments. The present embodiments show that a near portion, or in other words, an opening can be set at any position when a spectacle lens is viewed in a front view.

Embodiments 1 to 3

Bifocal lenses according to Embodiments 1 to 3 were produced by joining a first lens and a second lens according to Embodiments 1 to 3, with the first lens disposed at the front and the second lens disposed at the rear. The parameters of the bifocal lenses other than the position of the opening, which was a through hole, of the second lens are as follows.

Base curve BC: 6.00 D (diopter)
Spherical power S: −1.00 D
Astigmatic power C: −2.00 D
Astigmatic axis Ax: 180 degrees
Addition power ADD: +1.00 D
Diameter of bifocal lens: 70 mm
Shape of opening in front view: True circle
Diameter of opening: 24 mm As for the joining mode, the eyeball-side surface of the first lens and the object-side surface of the second lens were joined without any gap therebetween using an adhesive. In addition, both the object-side surface and the eyeball-side surface of the bifocal lens had no step, or, if they had any steps, the steps had a height of 0.10 mm or less.

In producing the first lens, a conventional semi-finished lens (having a BC of 6.00 as described above), owned by the Applicant, for a single focuses lens was used. Of conventional semi-finished lenses, owned by the Applicant, for a single focus lens, a semi-finished lens having a shape similar to the final intended shape of the eyeball-side surface of the bifocal lens was used in producing the second lens. That is, any new type of semi-finished lens was produced for the present embodiments.

Figure 1B:
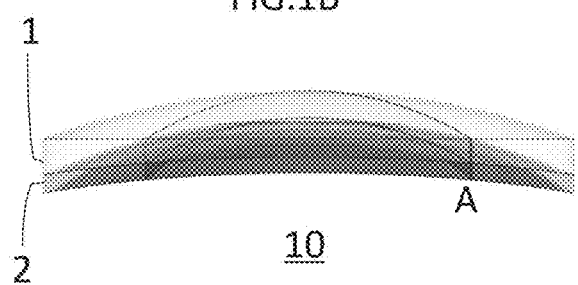
Figure 1C:
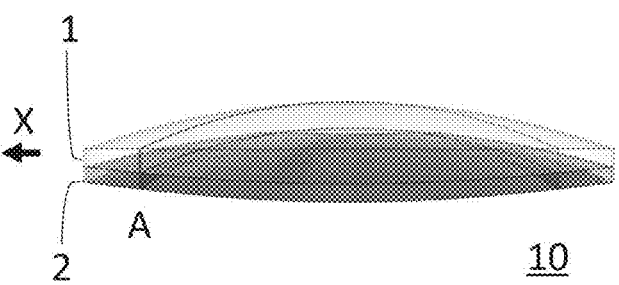
Figure 1D:
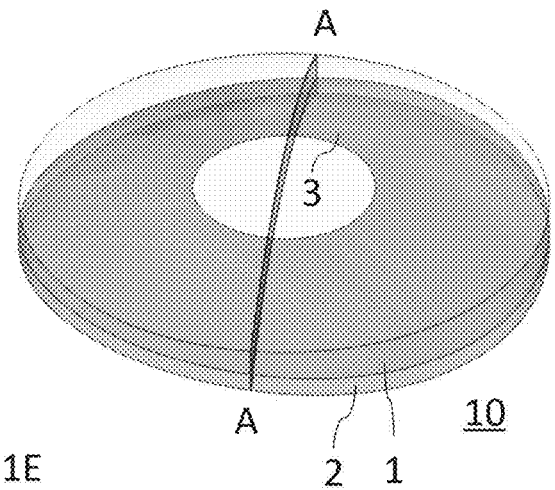
Figure 1E:
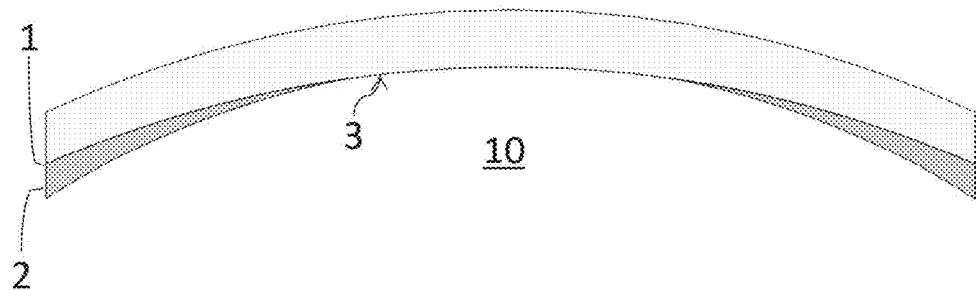

FIGS. 1A to 1E are schematic diagrams of a bifocal lens according to Embodiment 1, wherein FIG. 1A is a front view, FIG. 1B is a side view as viewed from the Y direction in FIG. 1A, FIG. 1C is a side view as viewed from the X direction in FIG. 1A, FIG. 1D is a perspective view, and FIG. 1E is a cross-sectional view taken along the line A-A in FIG. 1A.

Hereinafter, in the schematic diagrams of the bifocal lens, the first lens is shown transparent except for the contour thereof, and the second lens is depicted in gray. Note that the white dots in the upper middle portion of the bifocal lens shown in the front view show a reflection image attributed to the function of CAD software, and are not components of the lens of the present invention.

A cross section line A-A is depicted on the first lens shown in the drawings. The cross section line A-A passes through the geometrical center of the bifocal lens and the center of the opening. Although the depiction of the section line A-A is not necessary for Embodiment 1, in which the geometrical center of the bifocal lens and the center of the opening coincide with each other, the section line A-A is depicted in conformity with Embodiments 2 and 3.

In Embodiment 1, the center of the opening is set so as pass through the center of the second lens, and to be located in the direction of the normal of the object-side surface of the second lens before the opening is formed therein. In other words, the lens center of the bifocal lens and the center of the opening were made to coincide with each other.

Figure 2A:
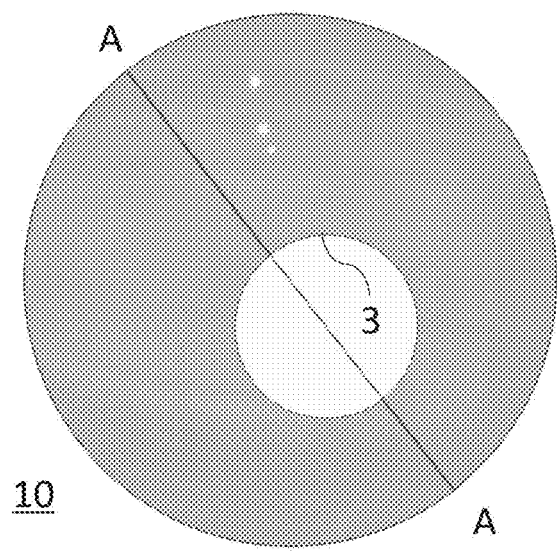
Figure 2C:
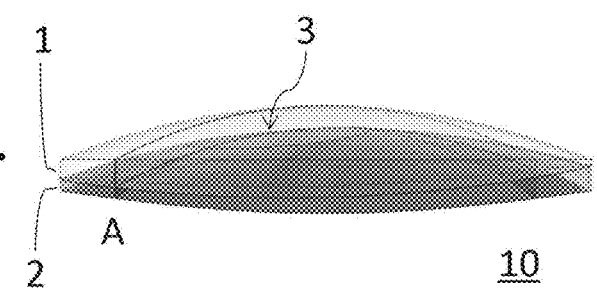
Figure 2B:
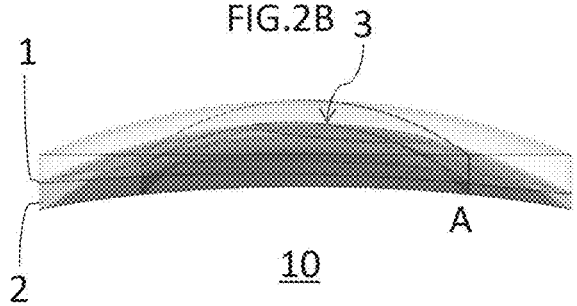
Figure 2D:
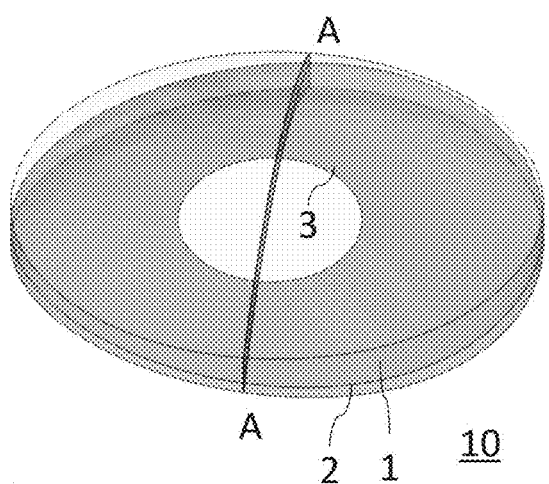
Figure 2E:
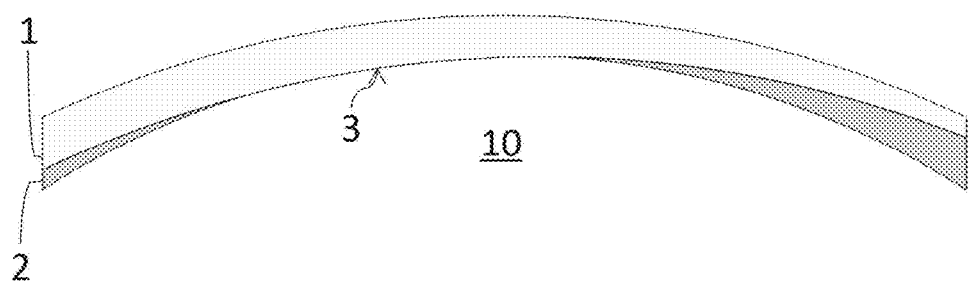

FIGS. 2A to 2E are schematic diagrams of a bifocal lens according to Embodiment 2, wherein FIG. 2A is a front view, FIG. 2B is a side view as viewed from the Y direction in FIG. 2A, FIG. 2C is a side view as viewed from the X direction in FIG. 2A, FIG. 2D is a perspective view, and FIG. 2E is a cross-sectional view taken along the line A-A in FIG. 2A.

In Embodiment 2, the center of the opening was set so as to pass through the center of the second lens, and to be located on a line that is inclined downward by 5 degrees and rightward (toward the nasal side for the wearer) by 5 degrees from the direction of the normal of the object-side surface of the second lens.

Figure 3A:
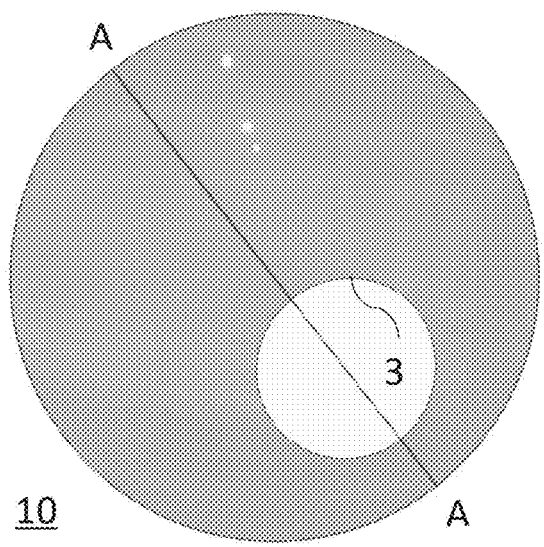
Figure 3C:
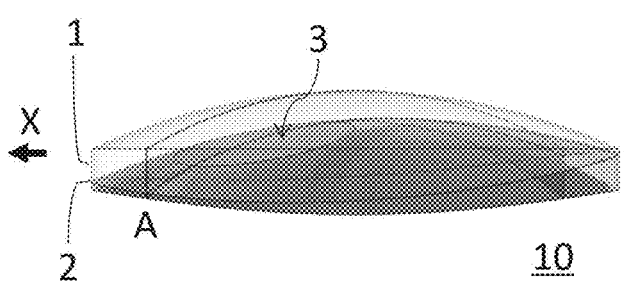
Figure 3B:
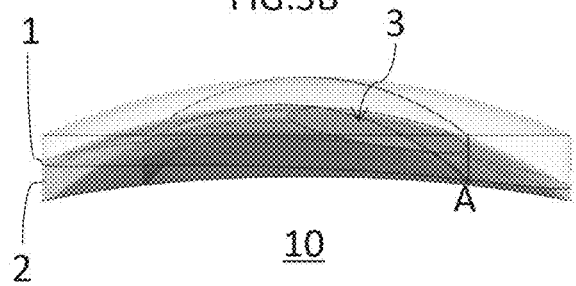
Figure 3D:
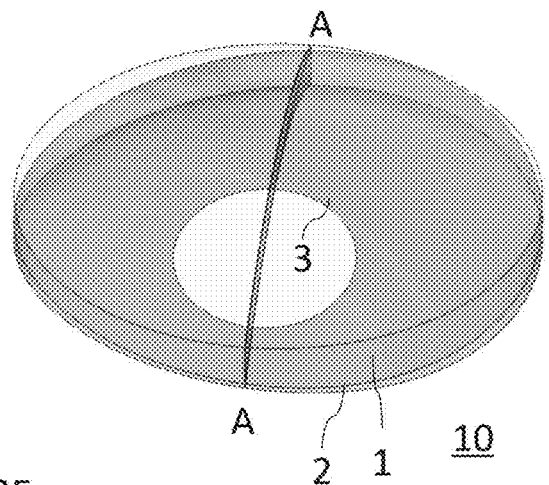
Figure 3E:
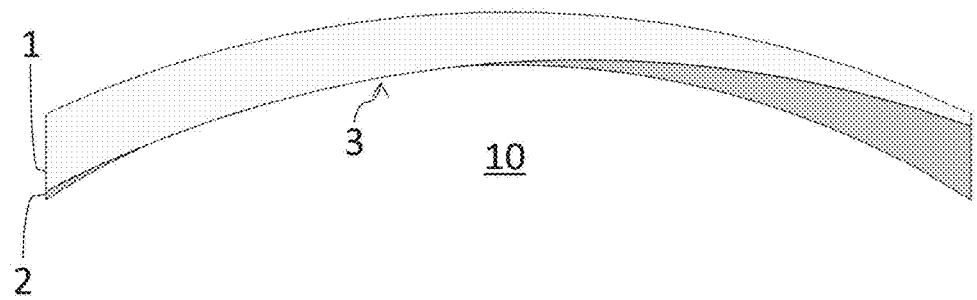

FIGS. 3A to 3E are schematic diagrams of a bifocal lens according to Embodiment 3, wherein FIG. 3A is a front view, FIG. 3B is a side view as viewed from the Y direction in FIG. 3A, FIG. 3C is a side view as viewed from the X direction in FIG. 3A, FIG. 3D is a perspective view, and FIG. 3E is a cross-sectional view taken along the line A-A in FIG. 3A.

Figure 4A:
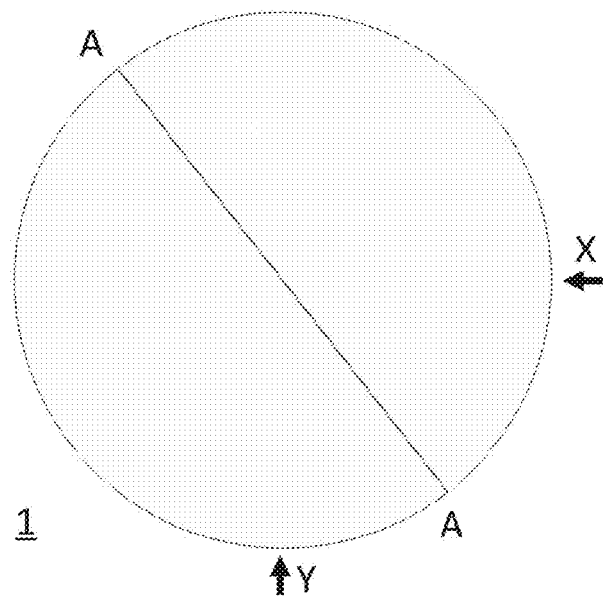
Figure 4B:
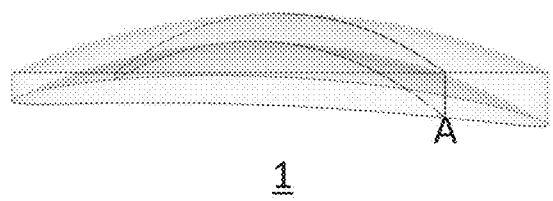
Figure 4C:
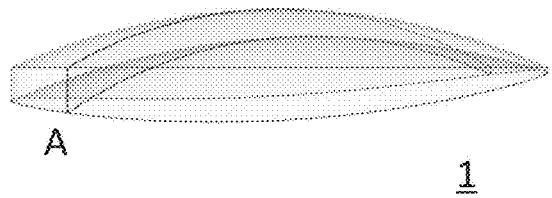
Figure 4D:
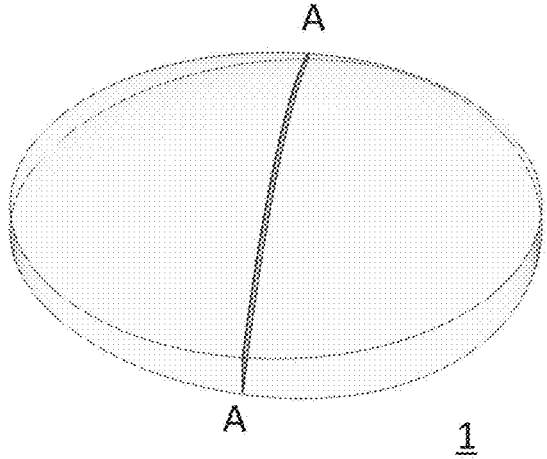

FIGS. 4A to 4D are schematic diagrams of a first lens according to Embodiment 3, wherein FIG. 4A is a front view, FIG. 4B is a side view as viewed from the Y direction in FIG. 4A, FIG. 4C is a side view as viewed from the X direction in FIG. 4A, and FIG. 4D is a perspective view.

Figure 5A:
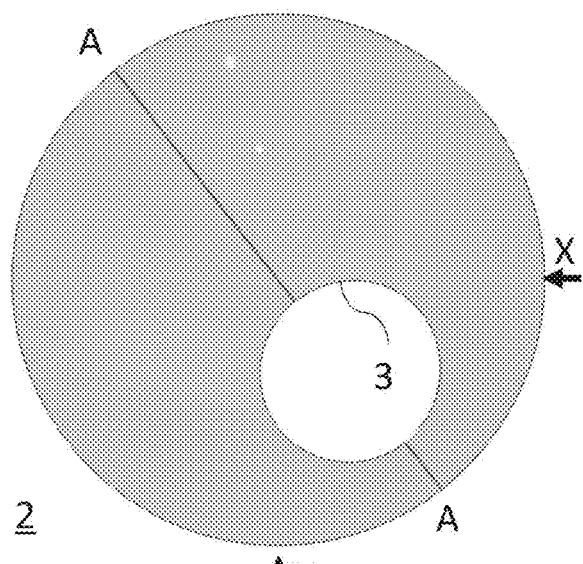
Figure 5B:
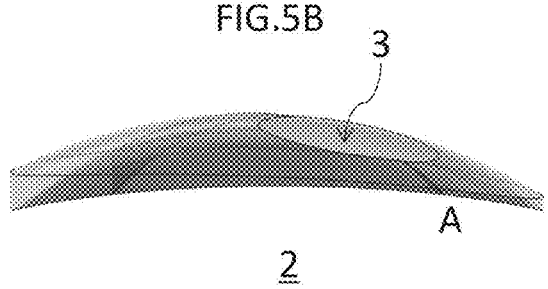
Figure 5C:
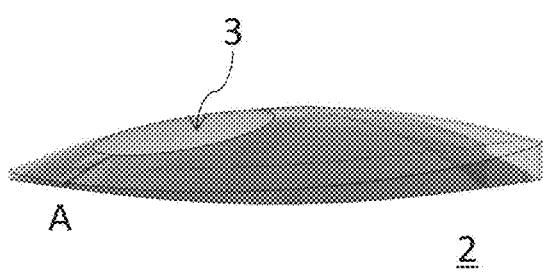
Figure 5D:
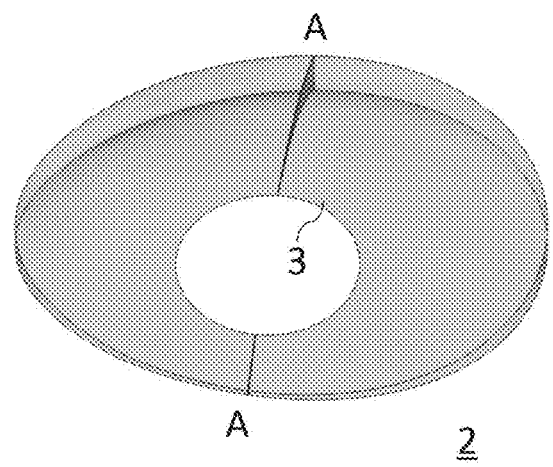

FIGS. 5A to 5D are schematic diagrams of a second lens according to Embodiment 3, wherein FIG. 5A is a front view, FIG. 5B is a side view as viewed from the Y direction in FIG. 5A, FIG. 5C is a side view as viewed from the X direction in FIG. 5A, and FIG. 5D is a perspective view.

In Embodiment 3, the center of the opening was set so as to pass through the center of the second lens, and to be located on a line that is inclined downward by 10 degrees and rightward (toward the nasal side from the wearer) by 10 degrees from the direction of the normal of the object-side surface of the second lens.

Embodiments 4 to 6

Bifocal lenses according to Embodiments 4 to 6 were produced. The same parameters as those used in Embodiments 1 to 3 were used except that the addition power ADD of the parameters of the bifocal lenses according to Embodiments 1 to 3 was changed from +1.00 D to +3.50 D.

The ratio (ratio 3) of the area of the first lens in a front view relative to the area of the spectacle lens in a front view as viewed from a direction of the optical axis direction in which the first lens is disposed was set to 1.00 in Embodiments 1 to 3, whereas the ratio 3 was set to 0.60 or more and less than 1.00 in Embodiments 4 to 6. The ratio 3 may be set to 1.00 by intentionally increasing the thickness of the spectacle lens (in particular, the first lens).

FIGS. 6A to 6E are schematic diagrams of a bifocal lens according to Embodiment 4, wherein FIG. 6A is a front view, FIG. 6B is a side view as viewed from the Y direction in FIG. 6A, FIG. 6C is a side view as viewed from the X direction in FIG. 6A, FIG. 6D is a perspective view, and FIG. 6E is a cross-sectional view taken along the line A-A in FIG. 6A.

In Embodiment 4, the center of the opening is set so as pass through the center of the second lens, and to be located in the direction of the normal of the object-side surface of the second lens before the opening is formed therein. In other words, the lens center of the bifocal lens and the center of the opening were made to coincide with each other.

FIGS. 7A to 7E are schematic diagrams of a bifocal lens according to Embodiment 5, wherein FIG. 7A is a front view, FIG. 7B is a side view as viewed from the Y direction in FIG. 7A, FIG. 7C is a side view as viewed from the X direction in FIG. 7A, FIG. 7D is a perspective view, and FIG. 7E is a cross-sectional view taken along the line A-A in FIG. 7A.

In Embodiment 5, the center of the opening was set so as to pass through the center of the second lens, and to be located on a line that is inclined downward by 5 degrees and rightward (toward the nasal side for the wearer) by 5 degrees from the direction of the normal of the object-side surface of the second lens.

FIGS. 8A to 8E are schematic diagrams of a bifocal lens according to Embodiment 6, wherein FIG. 8A is a front view, FIG. 8B is a side view as viewed from the Y direction in FIG. 8A, FIG. 8C is a side view as viewed from the X direction in FIG. 8A, FIG. 8D is a perspective view, and FIG. 8E is a cross-sectional view taken along the line A-A in FIG. 8A.

Figure 9A:
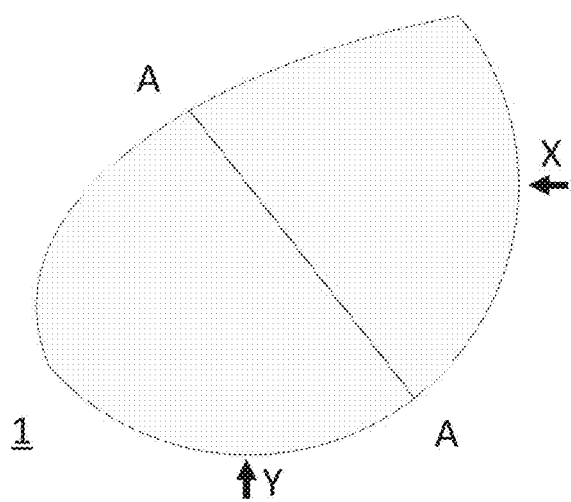
Figure 9B:
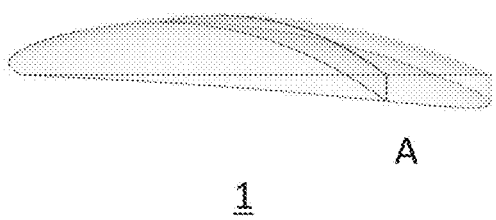
Figure 9C:
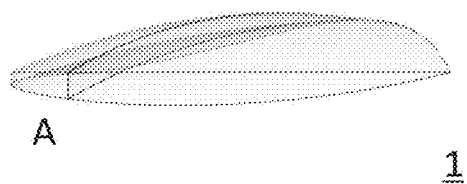
Figure 9D:
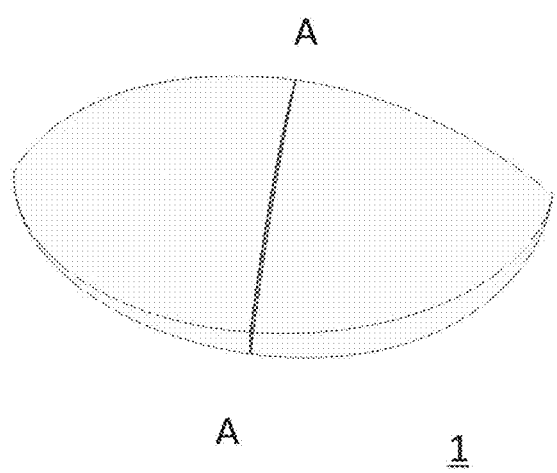

FIG. 9A to 9D are schematic diagrams of a first lens according to Embodiment 6, wherein FIG. 9A is a front view, FIG. 9B is a side view as viewed from the Y direction in FIG. 9A, FIG. 9C is a side view as viewed from the X direction in FIG. 9A, and FIG. 9D is a perspective view.

Figure 10A:
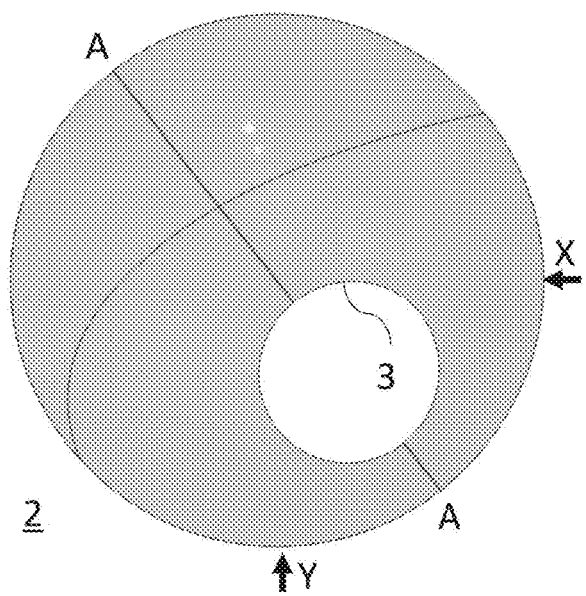
Figure 10C:
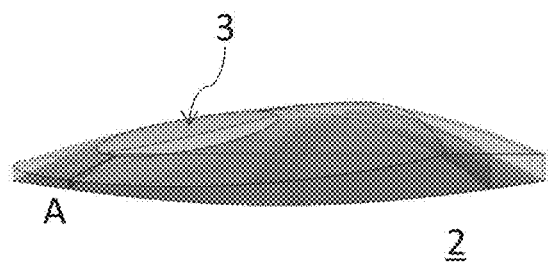
Figure 10B:
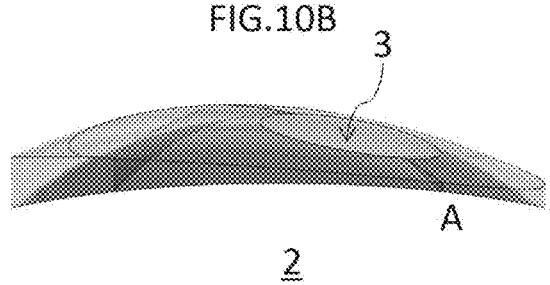
Figure 10D:
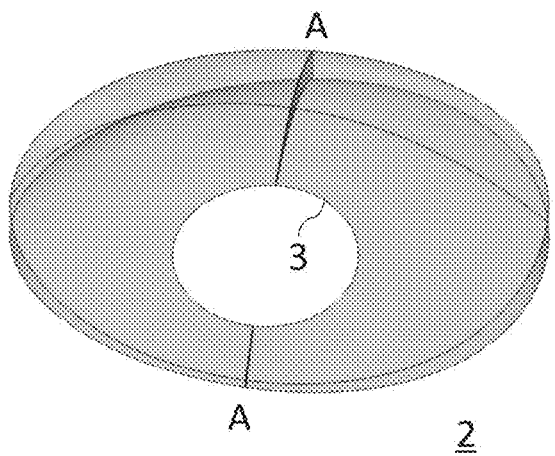

FIG. 10A to 10D are schematic diagrams of a second lens according to Embodiment 6, wherein FIG. 10A is a front view, FIG. 10B is a side view as viewed from the Y direction in FIG. 10A, FIG. 10C is a side view as viewed from the X direction in FIG. 10A, and FIG. 10D is a perspective view.

In Embodiment 6, the center of the opening was set so as to pass through the center of the second lens, and to be located on a line that is inclined downward by 10 degrees and rightward (toward the nasal side from the wearer) by 10 degrees from the direction of the normal of the object-side surface of the second lens.

As shown by Examples 1 to 6, bifocal lenses were produced that had a near portion with a high degree of freedom, and also a better appearance and a better field of view than those achieved when lenses were joined to each other at their cross sections, without a conventional segment being provided.

LIST OF REFERENCE NUMERALS

1 First lens
2 Second lens
3 Opening
10 Bifocal lens

What is claimed is:

1. A spectacle lens comprising
a first lens and a second lens that are arranged overlapping each other in an optical axis direction, wherein:
the second lens has an opening,
the first lens covers the opening,
the spectacle lens is a multifocal spectacle lens, and
the multifocal spectacle lens includes a near portion corresponding to at least one near distance at the opening portion, and a distance portion corresponding to a distance farther than the near distance at a portion other than the opening and in which the second lens and the first lens overlap each other.

2. The spectacle lens according to claim 1,
wherein the distance portion corresponds to one distance farther than the near distance.

3. The spectacle lens according to claim 1,
wherein the thickness of the second lens decreases toward an edge of the opening.

4. The spectacle lens according to claim 1,
wherein a ratio of an area of the first lens in a front view relative to an area of the spectacle lens in a front view as viewed from a direction of the optical axis direction in which the first lens is disposed is 0.60 or more.

5. The spectacle lens according to claim 1,
wherein, when a direction of an object that a wearer is looking at in the optical axis direction is an object side, and a direction opposite thereto is an eyeball side, the first lens is disposed on the object side, and the second lens is disposed on the eyeball side.

6. The spectacle lens according to claim 1,
wherein, when a direction of an object that a wearer is looking at in the optical axis direction is an object side, and a direction opposite thereto is an eyeball side,
an eyeball-side surface of the first lens and an object-side surface of the second lens are both a spherical surface or a toroidal surface, and
a curvature of the eyeball-side surface of the first lens and a curvature of the object-side surface of the second lens are equal.

7. The spectacle lens according to claim 1,
wherein the first lens and the second lens are joined to each other.

8. A spectacle in which the spectacle lens according to claim 1 is fitted into a frame in a state in which the spectacle lens is cut into a predetermined shape.

9. The spectacle lens according to claim 1, wherein
when an optical axis direction is a Z-axis direction, and a Z-coordinate of an eyeball-side surface is a sag value, a ratio of an absolute value of an increase/decrease amount in mm of the sag value relative to a distance in mm in any direction perpendicular to the Z axis is 5.00 or less in the second lens.

10. The spectacle lens according to claim 1, wherein
a thickness decrease ratio that is a thickness decrease amount in mm/a distance in mm in a direction extending toward an opening center or a gravity center, when a thickness decreases toward an edge of the opening is 1.00 or less in the second lens.

11. A spectacle lens manufacturing method comprising:
a lens obtaining step of obtaining, based on a prescription of a wearer, a first lens and a second lens that have been processed into predetermined shapes and that each have two main surfaces;
an opening forming step of forming, based on information relating to the wearer, an opening at a predetermined position of the second lens; and
after the lens obtaining step and after the opening forming step, a joining step of joining the first lens and the second lens to each other so as to be arranged in an optical axis direction, wherein:
the spectacle lens is a multifocal spectacle lens, and
the multifocal spectacle lens includes a near portion corresponding to at least one near distance at the opening portion, and a distance portion corresponding to a distance farther than the near distance at a portion other than the opening and in which the second lens and the first lens overlap each other.

12. The spectacle lens manufacturing method according to claim 9,
wherein the distance portion corresponds to one distance farther than the near distance.

13. The spectacle lens manufacturing method according to claim 11,
wherein, in the opening forming step, the thickness of the second lens is decreased toward an edge of the opening.

14. The spectacle lens manufacturing method according to claim 11,
wherein, in the joining step, a ratio of an area of the first lens in a front view relative to an area of the spectacle lens in a front view as viewed from a direction of the optical axis direction in which the first lens is disposed is set to 0.60 or more.

15. The spectacle lens manufacturing method according to claim 11, wherein, when a direction of an object that a wearer is looking at in the optical axis direction is an object side, and a direction opposite thereto is an eyeball side, in the joining step, the first lens is disposed on the object side, and the second lens is disposed on the eyeball side.

16. The spectacle lens manufacturing method according to claim 11, wherein, when a direction of an object that a wearer is looking at in the optical axis direction is an object side, and a direction opposite thereto is an eyeball side, an eyeball-side surface of the first lens and an object-side surface of the second lens are both processed into a spherical surface or a toroidal surface, and a curvature of the eyeball-side surface of the first lens and a curvature of the object-side surface of the second lens are made equal.

17. The spectacle lens manufacturing method according to claim 11, wherein, in the lens obtaining step, the first lens is obtained by processing an unformed surface of a semi-finished lens, and the second lens is obtained by processing both surfaces of a semi-finished lens.

18. A spectacle lens designing method comprising:

a lens designing step of designing a first lens and a second lens that have been processed into predetermined shapes and that each have two main surfaces so as to satisfy a prescription of a wearer when the first lens and the second lens are arranged overlapping each other in an optical axis direction; and an opening setting step of setting, based on information relating to the wearer, an opening at a predetermined position of the second lens, wherein:

the spectacle lens is a multifocal spectacle lens, and the multifocal spectacle lens includes a near portion corresponding to at least one near distance at the opening portion, and a distance portion corresponding to a distance farther than the near distance at a portion other than the opening and in which the second lens and the first lens overlap each other.

19. The spectacle lens designing method according to claim 18, wherein the distance portion corresponds to one distance farther than the near distance.

20. The spectacle lens designing method according to claim 18, wherein, in the opening setting step, the thickness of the second lens is decreased toward an edge of the opening.

21. The spectacle lens designing method according to claim 18, wherein, when a direction of an object that a wearer is looking at in the optical axis direction is an object side, and a direction opposite thereto is an eyeball side, an eyeball-side surface of the first lens and an object-side surface of the second lens are both designed in a spherical surface or a toroidal surface, and a curvature of the eyeball-side surface of the first lens and a curvature of the object-side surface of the second lens are made equal.

\* \* \* \* \*